July 4, 1950 O. KORNEI 2,513,653
MAGNETIC RECORD TRANSDUCING HEAD
Filed Jan. 22, 1947 6 Sheets-Sheet 1
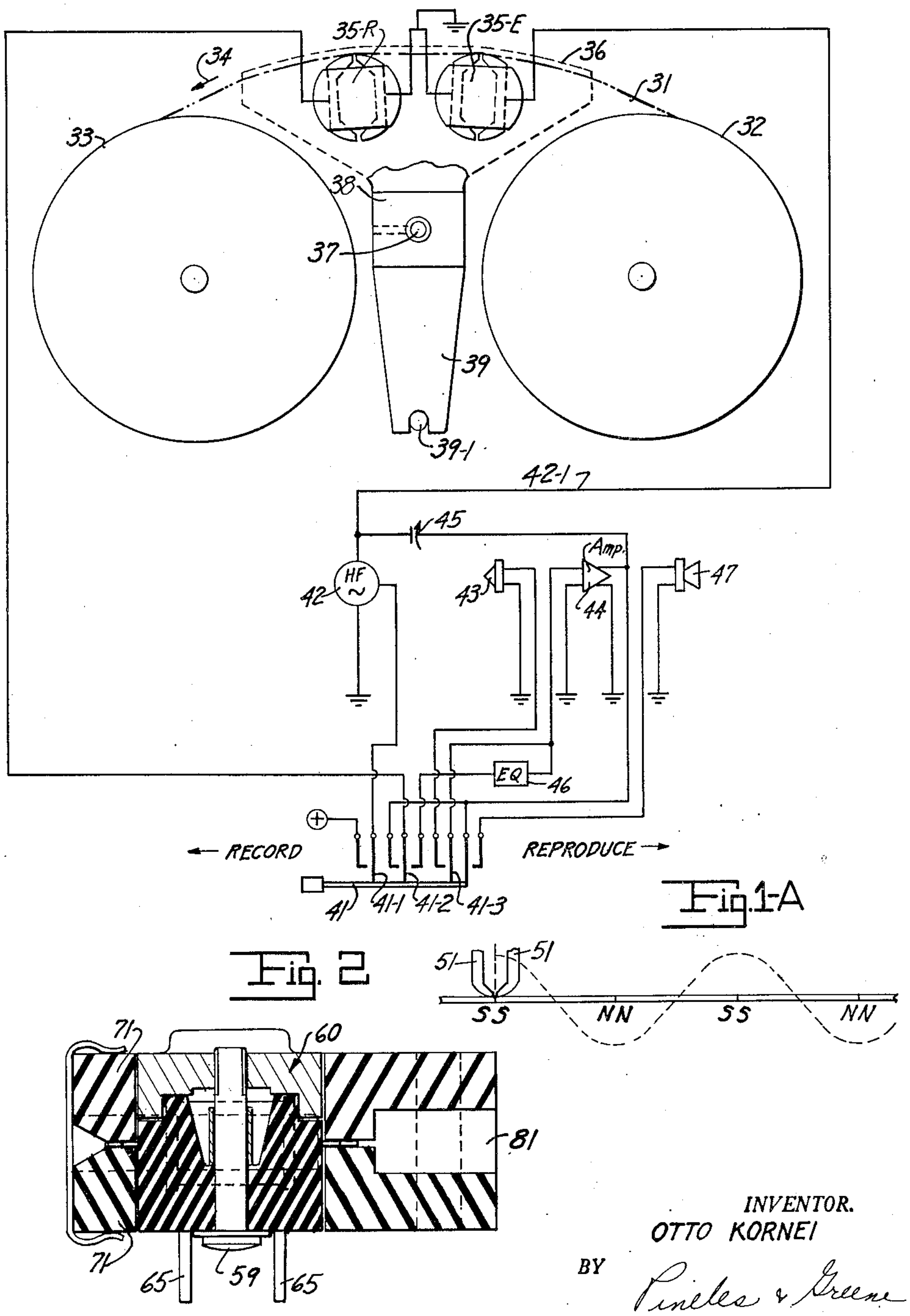
Fig. 1 Fig. 1-A Fig. 2
INVENTOR.
OTTO KORNEI
BY Pinelas & Greene
ATTORNEYS FIG. 3, FIG. 3-A
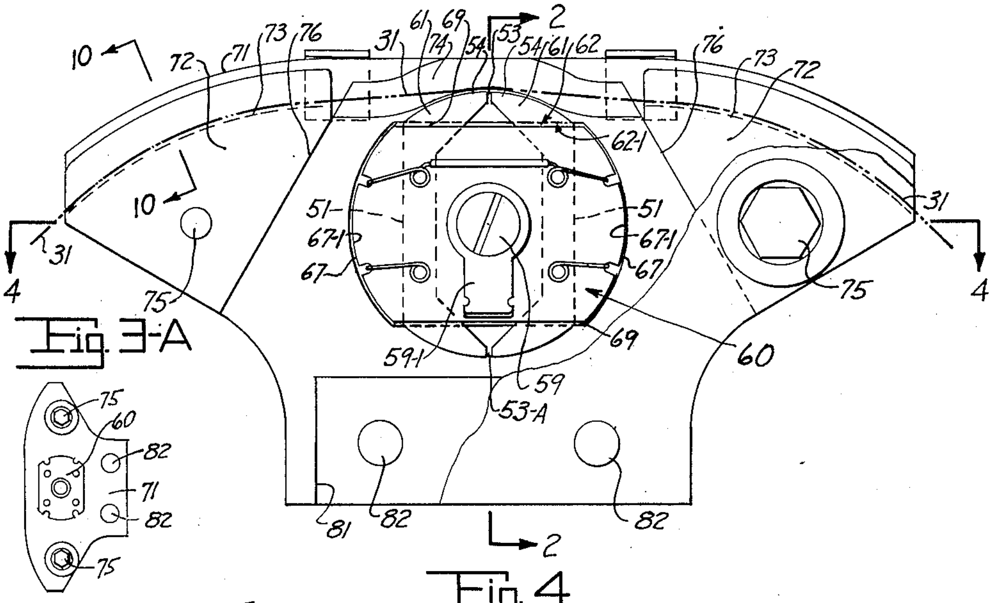
FIG. 4
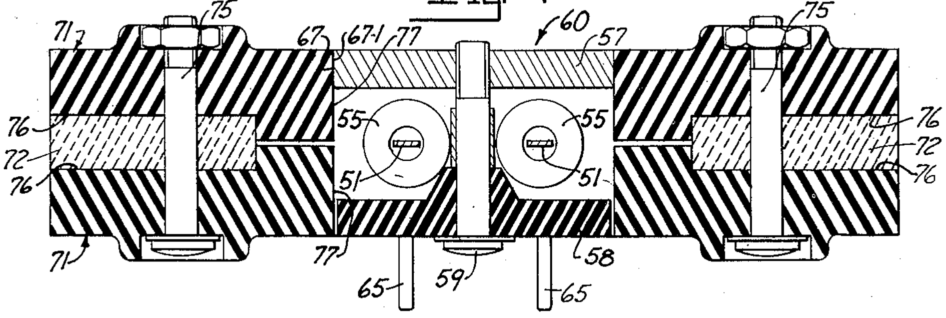
FIG. 5
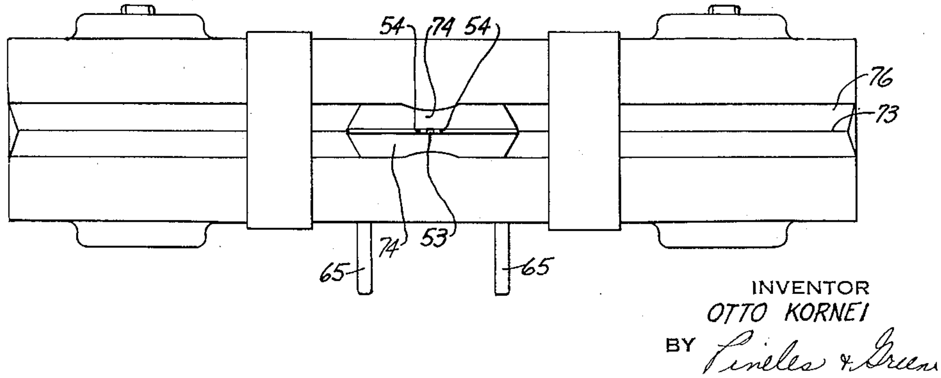
INVENTOR
OTTO KORNEI
BY Pirelles & Green
ATTORNEYS

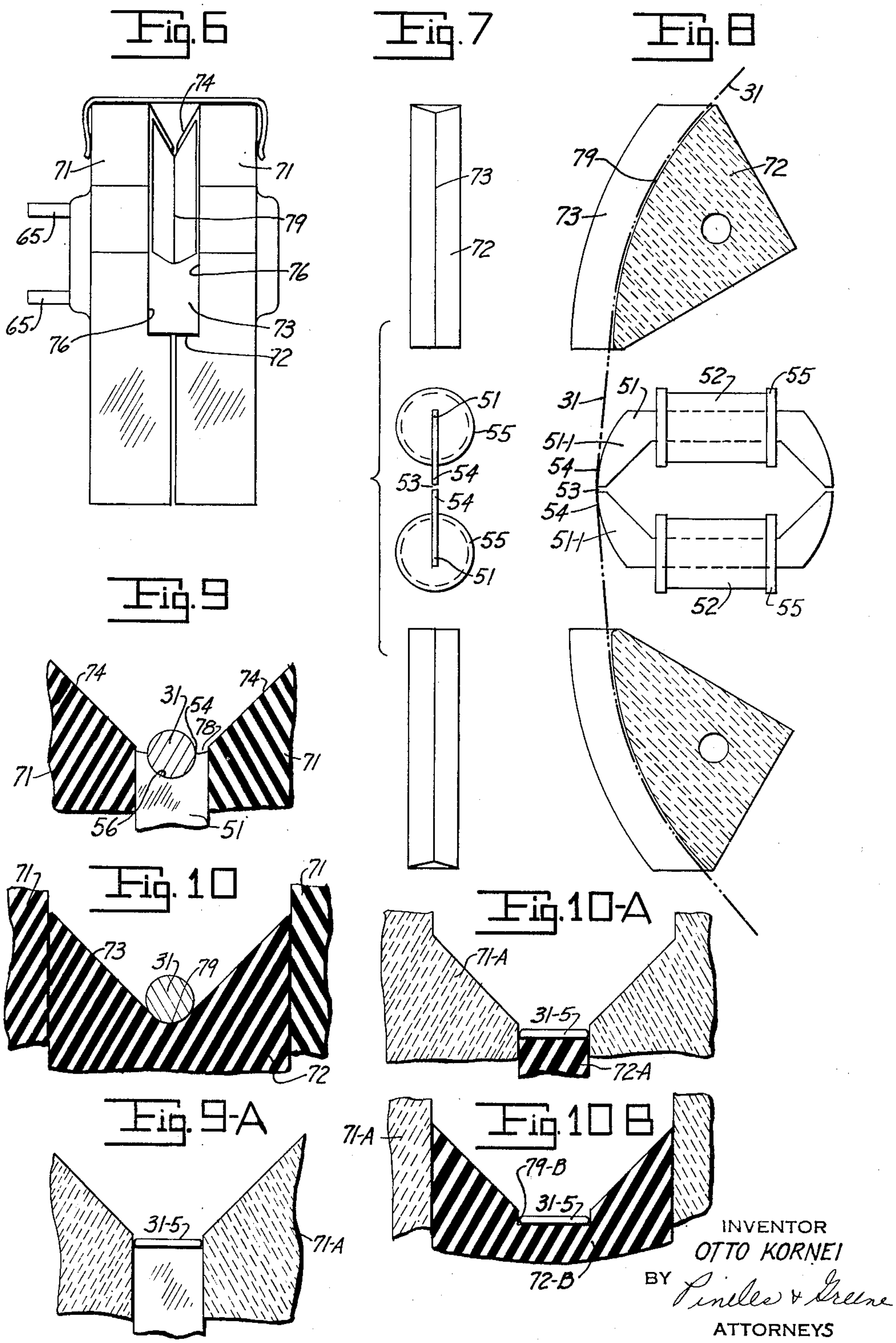
FIG. 6, FIG. 7, FIG. 8, FIG. 9, FIG. 10, FIG. 10-A, FIG. 9-A, FIG. 10B
INVENTOR
OTTO KORNEI
BY Pinelles & Greene
ATTORNEYS July 4, 1950 O. KORNEI 2,513,653

MAGNETIC RECORD TRANSDUCING HEAD

Filed Jan. 22, 1947 6 Sheets-Sheet 4

INVENTOR
OTTO KORNEI
BY Pindles & Greene
ATTORNEYS

July 4, 1950 O. KORNEI 2,513,653

MAGNETIC RECORD TRANSDUCING HEAD

Filed Jan. 22, 1947 6 Sheets-Sheet 5

INVENTOR.
OTTO KORNEI
BY Pineles & Greene
ATTORNEYS

INVENTOR.
OTTO KORNEI
BY [signature]
ATTORNEY

Patented July 4, 1950 2,513,653

UNITED STATES PATENT OFFICE 2,513,653

MAGNETIC RECORD TRANSDUCING HEAD

Otto Kornei, Cleveland Heights, Ohio, assignor to The Brush Development Company, Cleveland, Ohio, a corporation of Ohio Application January 22, 1947, Serial No. 723,541

20 Claims. (Cl. 179—100.2)

This invention relates to magnetic record transducing heads of the type which are used in magnetic recording systems for recording magnetic signals or reproducing magnetically-recorded signals by magnetic flux interlinkage between relatively moving magnetic elements of a magnetic recording medium and windings of the magnetic tranducer head which is used either for recording or for reproducing the signals or both.

The application Serial No. 550,570 of S. J. Begun et al. filed August 22, 1944, now abandoned, and assigned to the assignee of the present application is directed to a magnetic record transducing head provided with a magnetic core structure having two thin flat pole pieces held aligned in a plane across a non-magnetic gap along one side of a moving narrow magnetic record track, such as a thin wire or filament, and a guide structure for longitudinally guiding the thin recording medium along longitudinally aligned edge surfaces of the pole pieces forming pole faces separated by the gap for concentrating the magnetic flux which interlinks an element of the moving magnetic record track with the transducer winding interlinked with the core of the recording head.

The effectiveness of the magnetic recording and reproducing process depends on the maintenance of stable operating conditions between the diminutive non-magnetic gap region separating the pole faces of the magnetic transducer head and the diminutive element of the moving magnetic record track bridging the gap. These conditions are extremely critical and the difficulties encountered in the operation of magnetic recording systems are greatly increased when the recording and reproducing process is carried on on a thin magnetic wire or filament, and particularly when the magnetic record transducing head is also utilized for level winding or distributing the wire as it is being transported from one reel to the other.

When using a thin magnetic wire which has usually to be made of a hard ferro-magnetic alloy, the difficulties in maintaining stable operating conditions between the moving wire and the relatively soft magnetic material of the pole faces along which it moves are increased because the wire wears a groove into the softer pole faces along which it moves, and it is important to limit the maximum pressure exerted by the wire on the pole faces. The magnetic tranducer head of the application Serial No. 550,570 referred to above made it possible to overcome these difficulties to a substantial extent by combining such transducer head with guide surface elements arranged so as to guide the thin wire towards and away from the longitudinally aligned pole faces bordering the gap and maintain stable contact conditions therebetween while at the same time limiting the maximum pressure exerted by such wire on the pole pieces.

The present invention is directed to a magnetic head of the general type described in the above identified application combining the pole piece structure of the transducer head with the guide surface elements for guiding the wire towards and away from the longitudinally aligned pole faces of the pole piece structure in such manner as to simplify the manufacture of such record transducer head and the maintenance of stable operating conditions in guiding the wire towards and away from the longitudinally aligned pole pieces, while at the same time limiting the maximum pressure exerted by the wire on the pole pieces.

The foregoing and other objects of the invention will be best understood from the following description of exemplifications thereof, reference being had to the accompanying drawings, wherein Fig. 1 is a diagrammatic view showing the principal elements of a magnetic recording and reproducing system equipped with a magnetic record transducer head of the invention;

Fig. 2 is a vertical cross-sectional view of a tranducer head exemplifying the invention along line 2—2 of Fig. 3;

Fig. 3 is a top view of the transducer head of Fig. 2 with parts of the upper guide wall structure broken away;

Figures 11, 12, 13, 14, 15, 16, 17, 18:
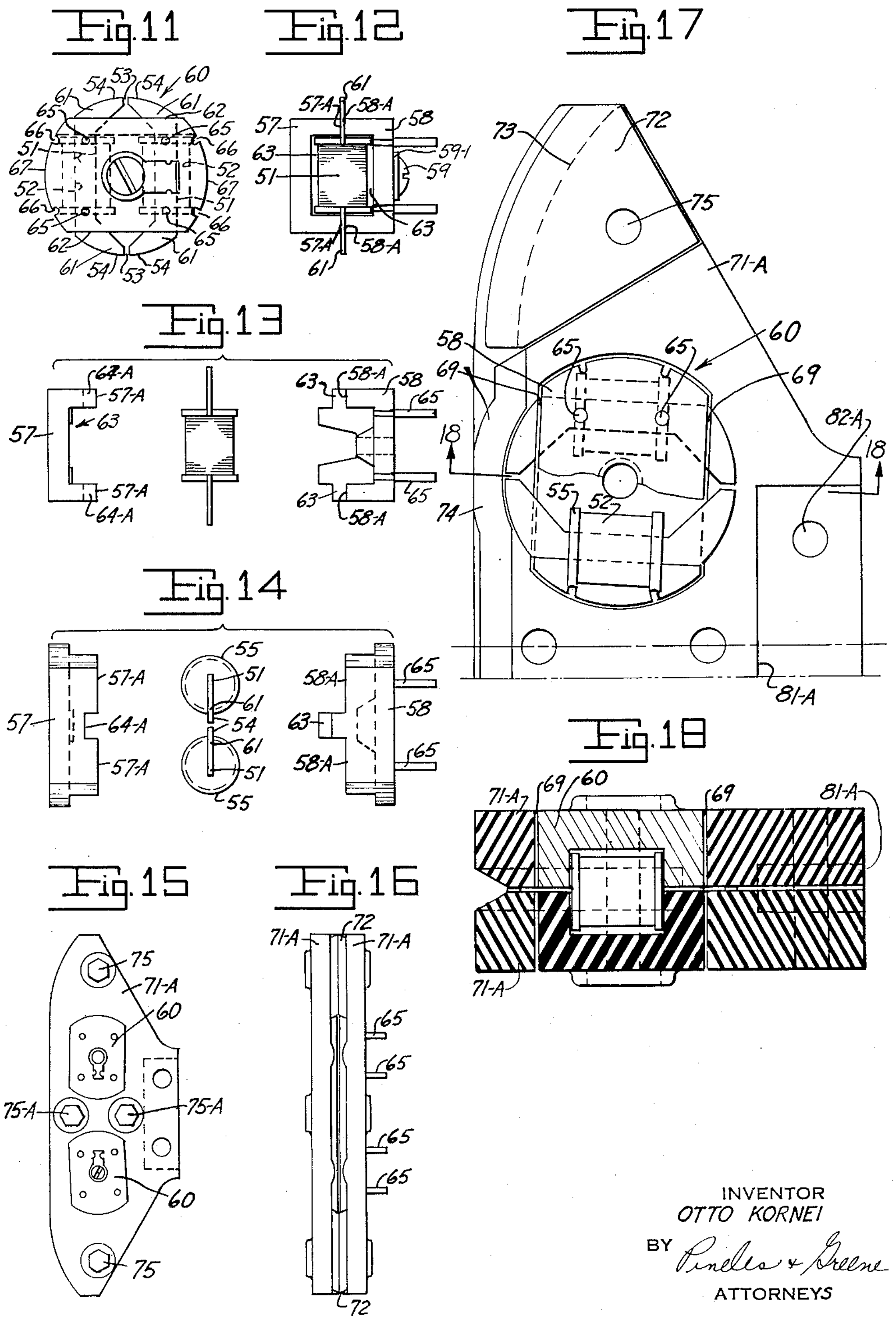
Figure 19:
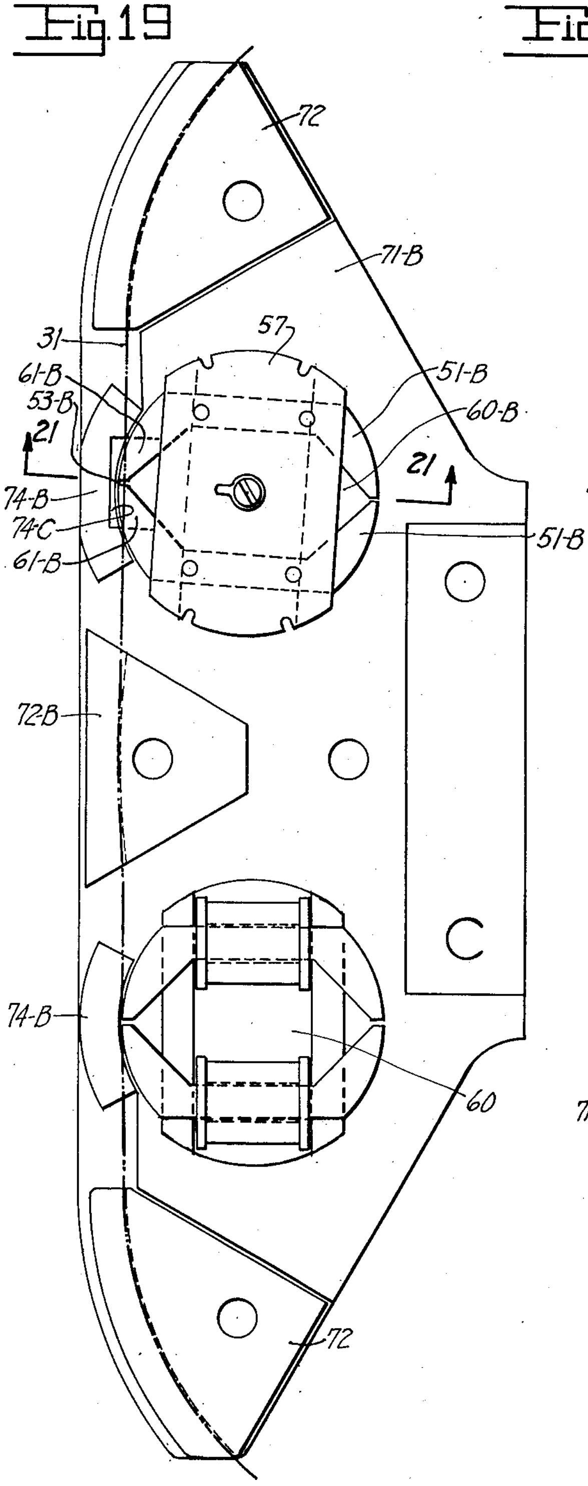
Figure 20:
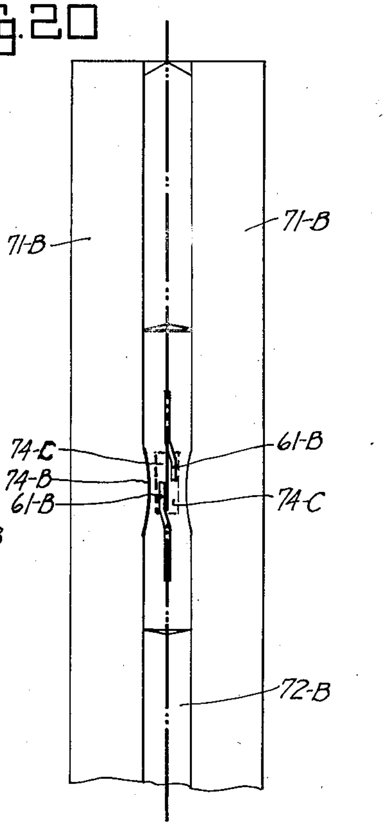
Figure 21:
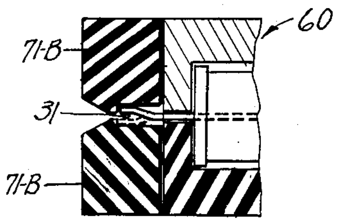
Figures 22, 23, 24, 25, 26, 27, 28, 29:
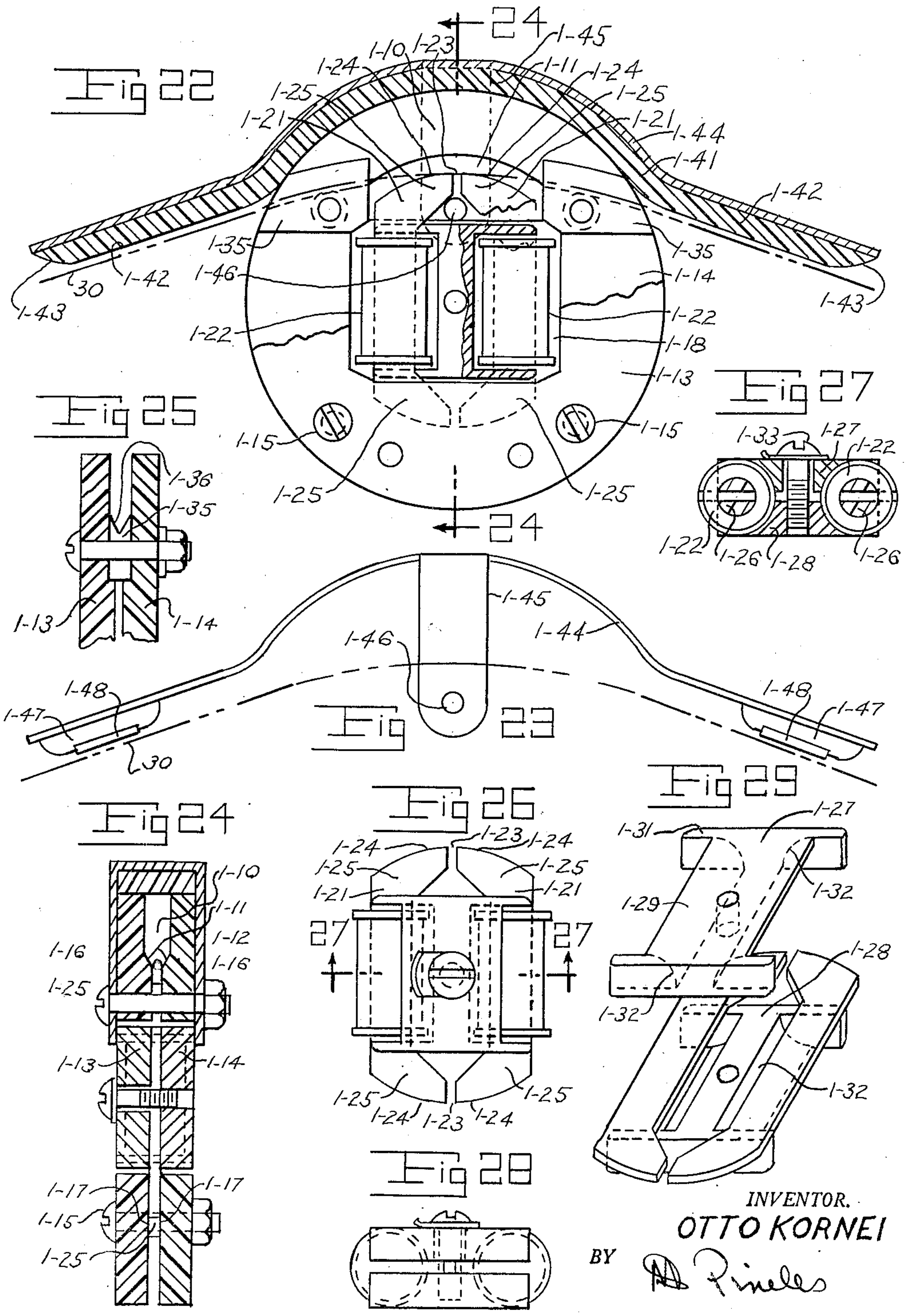

Fig. 3–A is a plan view of the assembled head;

Fig. 4 is a cross-sectional view along line 4—4 of Fig. 3;

Fig. 5 is a front elevational view of the transducer head shown in Figs. 3 and 4;

Fig. 6 is an end view of the transducer head shown in Figs. 3 to 5;

Fig. 7 is a front view showing the operational alignment of the pole faces and guide channel elements of the tranducer head of Figs. 2 to 6;

Fig. 8 is a side view showing the operational alignment of the elements of Fig. 7;

Fig. 9 is an enlarged detail cross-sectional view similar to Fig. 2 showing the cooperative relationship of the elements of the recording medium and the elements of the transducer head in the pole tip region thereof;

Fig. 10 is an enlarged cross-sectional view of the guide channel region of the tranducer head along line 10—10 of Fig. 3;

Figs. 9-A and 10-A are views similar to Figs. 9 and 10 of a modified form of transducer head designed for cooperation with a recording medium in the form of a wire-like tape;

Fig. 10-B is a view similar to that of Fig. 10-A showing a modified form of guide structure;

Fig. 11 is a view similar to Fig. 3 of the double pole piece unit of the transducer head shown in Figs. 2 to 6;

Fig. 12 is a side view of the double pole piece unit of Fig. 11;

Fig. 13 is an exploded view of the elements of the double pole piece unit as shown in Fig. 11;

Fig. 14 is an exploded view of the elements of the double pole piece unit as shown in Fig. 12;

Figs. 15 and 16 are views similar to Figs. 3 and 5 showing two transducer elements combined in a single transducer head structure;

Fig. 17 is an enlarged view similar to Fig. 15 of one half of a transducer head shown therein with one guide wall removed;

Fig. 18 is a cross-sectional view along line 18—18 of Fig. 17;

Figs. 19 and 20 are views similar to Figs. 15 and 16 of another form of transducer head of the invention combining two transducer head units;

Fig. 21 is a cross-sectional view along line 21—21 of Fig. 19;

Fig. 22 is a view similar to Fig. 3 showing a modified form of a transducer head exemplifying the invention;

Fig. 23 is a view similar to Fig. 22 showing a modified form of a retainer structure for such transducer head;

Fig. 24 is a cross-sectional view along line 24—24 of Fig. 22;

Fig. 25 is a cross-sectional view along line 25—25 of Fig. 22;

Fig. 26 is a top view similar to Fig. 22 of the double pole piece unit thereof;

Fig. 27 is a cross-sectional view along line 27—27 of Fig. 26;

Fig. 28 is a front view of the double pole piece unit of Fig. 23;

Fig. 29 is an exploded perspective view of the mounting structure of the double pole piece unit of Figs. 23, 24, the pole piece elements being shown in a dotted line held along the aligning surfaces of one mounting element; and Fig. 1-A is a diagrammatic view illustrative of the magnetic recording process.

Fig. 1 illustrates in a simplified diagrammatic manner the principal elements of a magnetic recording system operating with one form of a magnetic record transducer head exemplifying the invention. An elongated magnetic recording medium in the form of a thin filamentary recording medium 31, such as a wire of a ferromagnetic alloy, is arranged to be impelled from a supply reel 32 to a take-up reel 33 which form part of a suitable reeling mechanism which is arranged to rotate either one or the other reels for carrying on a recording or reproducing operation when the recording medium is reeled on reel 33 and to reel the recording medium back on reel 32 for reproducing the previously made record or for making thereon a new recording.

In moving from one reel toward the other, the thin recording medium 31 is guided past a pole face region of a magnetic erasing head 35—E and of a magnetic recording and playback head 35—R. The two heads 35—E and 35—R form part of a guide structure 36 provided with a guide groove along which the thin magnetic wire is guided into positive contact engagement with the pole faces of the two heads 35—E, 35—R when it is reeled from supply reel 32 to the take-up reel 33 during recording or reproducing operations. The guide structure 36 of the magnetic transducer head is also utilized to level wind and uniformly distribute the thin recording medium 31 when it is reeled from one or the other of the two reels 32, 33.

In the arrangement shown in Fig. 1, the reeling mechanism is shown provided with a shaft 37 having an endless cross thread so that when the shaft 37 is rotated, it will impart a reciprocatory motion to a hub 38 provided with a follower pin engaging the thread. The hub 38 which is reciprocated by the level-wind shaft 37 forms part of a guide arm 39 engaging an additional guide pin 39—1 and carrying on its end fixedly secured thereto the transducer head 36 for imparting thereto a corresponding reciprocatory motion. The level wind shaft 37 is suitable coupled in a manner not shown to the level drive mechanism so as to rotate in predetermined synchronized relation to the reels for imparting to the transducer head structure 36 a reciprocatory movement of the proper stroke range and assure that the recording medium 31 guided by the transducer head structure is level wound on the reel on which it is reeled.

The recording system of Fig. 1 is arranged to carry on magnetic recording and reproducing operations under the control of a multi-blade switch 41 which establishes the recording circuits when its switch blades are actuated to the left, as viewed in Fig. 1, and to establish the reproducing circuit when its switch blades are actuated to the right.

When the control switch 41 is in the left-hand recording position, its contact blade 41—1 connects a source of high-frequency oscillations 42 to a source of power supply indicated by a (+) sign, thereby energizing the oscillator to generate the high frequency oscillations and supply them through a lead 42—1 to the windings of the erasing head 35—E, this as well as the analogous other circuits being completed by the negative ground connections shown. The high frequency erasing current supplied by the oscillator 42 to the erasing head 35—E is of sufficiently large amplitude so that each longitudinal element of the thin moving magnetic recording medium 31 passing the pole faces of the erasing head 35—E is subjected to an alternating flux strong enough to erase any previous magnetic signal records of the moving medium and restore the magnetic elements thereof to a magnetically neutral condition.

After being subjected to the magnetic erasing action by the erasing head 35—E, each element of the moving recording medium 31, upon reaching the gap region of the pole faces of the record transducer head 35—R, is subjected to a magnetic recording flux produced by the amplified signal currents which are to be recorded and supplied by a signal source, such as a microphone 43, and a superimposed high frequency biasing flux component produced by a high frequency current component supplied by the oscillator 42. The electric signals of the microphone 43 are supplied to the transducer head 35—R by way of the recording amplifier 44 and contact blade 41—3 of switch 41, in its left-hand recording position. The high frequency bias component is derived from the oscillator 42 by a circuit such as shown, which includes an adjustable coupling condenser 45 for supplying an adjustable component of the high frequency oscillations to the output circuit of the amplifier 44 the output current of which is delivered to the windings of the recording head 35—R.

The coupling condenser 45 and the other circuit elements are designed to mix a suitable component of the high frequency oscillator derived from the oscillator 42 with the amplifier signal currents supplied by the microphone in such manner as to produce in the gap region of the magnetic head 35—R the desired signal recording flux as well as the required superimposed high frequency biasing flux component. In general, when recording signals of the audible frequency range, good results are obtained by using a high frequency biasing flux of about 30 kilocycles per second and the same source of high frequency signals may be used both for supplying the relatively large high-frequency erasing current to the erasing head 35—E as well as the considerably smaller high-frequency biasing component to the recording head 35—R.

To reproduce the recorded signal while the recording medium is moving in the same direction, that is, from left to right, the recording switch 41 is actuated from its neutral center position to the right-hand playback position. In the right-hand play-back position, the switch contact 41—1 disconnects the oscillator 42 from the power supply and no erasing and biasing currents are supplied to the erasing head 35—E and the transducer head 35—R.

Furthermore, contact blade 41—2 in its right-hand play-back position disconnects the winding of the transducer head 35—R from the output side of the amplifier and connects it instead through an input circuit, shown as including an equalizer 46, to the input side of the amplifier 44, the output side of which is now connected by an additional contact blade of the control switch 41 to a reproducing device, such as a loudspeaker 47.

Essentially the same magnetic core structure and associated windings may be used either as a recording head or a reproducing head or erasing head of a recording system of the type shown in Fig. 1. In some applications, a system of the type shown in Fig. 1 may be operated with a single transducer head structure formed of a core and winding for performing the recording, reproducing as well as the erasing operations, in which case the winding of the transducer head is connected to the source of erasing current during the rewinding operation for erasing the previous record while the wire is reeled back from reel 33 to reel 32.

In Figs. 2 to 9 and 10 to 14 is shown one form of a recording, reproducing and playback head exemplifying the invention. The transducer head shown embodies a magnetic core structure formed of two alike pole pieces 51 and transducer windings interlinked with the core shown formed of two alike transducer winding coils 52, one coil for each pole piece unit. If the same magnetic transducer head structure is intended for recording as well as reproducing magnetic signals, the pole pieces have to be made of high permeability magnetic material, such as molybdenum Permalloy or Mumetal. If a different magnetic transducer head structure is used for recording or reproducing, the magnetic core of the recording head may be made of a magnetic material, such as silicon steel. Each of the two pole pieces 51 is made of relatively thin magnetic sheet metal, the thickness of the pole pieces being of the order of the thickness of the recording wire or filament 31.

The two flat pole pieces 51 forming the magnetic core structure of the transducer head are held aligned in a plane on the opposite sides of non-magnetic gaps 53 of the order of .001 inch width, the pole piece structure shown being provided with two symmetrically arranged alike gaps, the additional gap being shown at 53—A. The outwardly facing edge surface 54 of the pole pieces which border the gap 53 are convexly curved so as to constitute two elongated longitudinally aligned thin convex pole faces against which the thin magnetic record wire or filament 31 is flexed as it moves past the gap region 53 separating the pole faces. Each of the two transducer winding coils 52 is wound on a bobbin 55 having a longitudinal slit in which the flat pole piece 51 is placed so that the bobbin body forms a mechanically strong support for its pole piece, the coil being wound on the bobbin after the pole piece is placed therein.

Alternatively, each pole piece unit 51 may be formed of two equal halves and inserted into the bobbin slit from the opposite ends of the bobbin after the coil is first wound thereon.

As shown in Figs. 11 to 14, the two pole pieces 51 with the coil bobbins mounted thereon are united to a common substantially rigid mounting structure 56 with which they form a double-pole-piece unit, generally designated 60. The mounting structure 56 is formed of two complementary clamping members 57, 58 which are clamped to each other by a screw 59 and provided with facing aligning surfaces 57—A, 58—A between which the two pole pieces are held clamped in their aligned position so that the two sets of pole tip regions 61 of the pole pieces 51 adjoining their gaps 53, 53—A project beyond the flat boundary regions 62 of the mounting structure.

One of the complementary mounting members, for instance, mounting member 57 is shown made of metal and the other mounting member 58 of an insulating mounting compound, the two mounting members being shaped so as to provide between their aligning surface regions 57—A, 58—A cavity space 63 within which the coil bobbins 52 are housed. Furthermore, the facing sides of the two mounting members 57, 58 have mating aligning projections 64 and aligning recesses 64—A which interfit into each other to facilitate the aligning and assembly of the two mounting elements 57, 58 on the opposite sides of the aligned pole pieces which are held clamped therebetween. The mounting member 58 which is formed of an electrically insulating compound has embodied therein four electrically conducting metallic terminal pins 65 which serve as terminal connections to the four ends of the two coils of each double-pole-piece unit. The end leads of the four coils are passed from the ends of the coils to the four terminals 65 along the grooves 66 formed along the arcuate boundary regions of the mounting member 58 overlying the coils.

In the transducer head of the invention, such as shown in Figs. 2 to 9, and 10, positive guidance of the thin magnetic record wire or filament 31 towards and from the thin aligned edge surface of the pole faces bordering the critical gap region 53 of the core structure is made possible by mounting the double-pole-piece unit between two identically aligned guide wall members and a guide structure which hold clamped between their facing surface regions the pole tip regions 61 of the core structure joining the pole pieces, as well as two relatively rigid guide channel elements of materially greater thickness than the pole pieces and provided with guide grooves having at their deepest region narrow channel tracks longitudinally aligned with the center region of the longitudinal pole faces for positively guiding the moving magnetic record wire or filament toward and from the center region of the aligned pole faces.

In the transducer head of the invention shown in Figs. 2 to 8, the guide structure is formed by two alike guide wall members 71 holding clamped therebetween the double-pole-piece unit 60 as well as two substantially rigid guide wall elements 72 of considerably greater thickness than the pole pieces, and provided along their edges with longitudinal guide grooves 73 arranged so as to form with a central guide groove region 74 of the two guide wall members an outwardly tapering guide channel which automatically guides a thin wire or filament moving past the transducer head and assures positive stable contact engagement of a portion of the wire or filament with the central region of the longitudinally aligned pole faces 54 of the magnetic core structure of the transducer head.

The two guide wall members 71 are suitably held clamped to each other, as by two screws 75 and cooperating nuts, the shanks of the screws extending also through holes formed in the rigid guide block elements 72 which fit and are held clamped within recessed inwardly-facing wall regions 76 of the two wall members 71. The intermediate portions of the two wall members between which the double-pole-piece unit 60 is clamped are provided with oblong cavities or holes 77 for holding therein the mounting elements 57, 58 of the double-pole-piece unit 60. The edge regions of the wall members 71 bordering the cavity 77 and overlying the pole tip regions 61 of the pole pieces serve to clamp them firmly in their operative positions. Gap regions 53 of the double-pole-piece unit are exposed along the deepest region of the intermediate guide channel portion 74 formed by the central region of the two guide wall members.

In a magnetic recording system utilizing as a recording medium a thin wire or filament, the wire is usually made extremely thin, the size of the wire ranging between about six mils down to about two mils thickness. Practical difficulties are encountered if the pole pieces of a magnetic record structure of the type described therein are made of the same thickness as the pole pieces, and for practical reasons the pole pieces are made of a greater thickness than the magnetic wire or filament.

It has been found in practice that the very effective magnetic transducer heads suitable for magnetic recording with A. C. biasing and obliterating current may be made with flat pole pieces 51 each of which is formed of a single magnetic sheet portion, the thickness of which is about 14 mils. Since the highly permeable magnetic material of the pole pieces is much softer than the material of the steel wires used as a magnetic recording medium, the motion of such hard recording wire wears away the soft magnetic material of the pole pieces and after a period of use, the wire wears into the pole faces 54 a groove, as indicated at 56 in Fig. 8, which provides a larger contact surface of the pole faces. In making magnetic recording heads of the type shown for use with round wires, the flat surface region of the elongated longitudinally aligned pole faces 54 is subjected to a wearing-in process so as to wear into the central region of the aligned pole faces a guide groove and reduce to a minimum the wearing-in process that would occur in actual use and assure that substantially the entire circular side of the wire facing the pole faces 54 along which it moves is engaged by a corresponding circular surface of a groove 56 formed within the pole faces, such as shown in Fig. 8.

As shown in Fig. 9, the guide channel portion 74 formed along the central guide region of the two wall members between which the effective gap region of the pole pieces is clamped, is provided with outwardly tapering guide surfaces, the deepest region of which is formed by parallel wall portions 78 forming a narrow guide channel track of the width of the pole pieces.

As indicated in Fig. 10, the guide channel 73 formed on the guide edges of the relatively thick and rigid guide channel element 72 held longitudinally aligned on the opposite sides of the longitudinal pole face region of the core structure is likewise provided with outwardly tapering guide surfaces, the deepest region being formed by a narrow channel track 79 which is longitudinally aligned with the central longitudinal guide groove 56 formed along the central region of the pole pieces. It will be noted that the two guide wall members 71 as well as the two guide channel elements 72 are alike and symmetrically arranged with respect to the longitudinally aligned and exposed pole face regions of the pole pieces of the core structure. This enables a simple assembly and clamping of the several elements into a unitary transducer head structure which positively guides a thin wire towards and away from the position of critical engagement with the gap region of the pole pieces and assures that each element of the moving wire or filament passing along the thin pole face region of the pole pieces is maintained in stable contact engagement with the gap region thereof.

Extensive experience with magnetic heads of the type shown has established that although the two guide channel elements 72, with their central narrow guide channel track 79 which guides the thin moving wire or filament 31 towards and away from the central guide channel portion 56 of the pole faces are held a substantial distance in front and behind the pole faces 54, the simple guide structure shown automatically guides the thin wire into positive stable contact with the central longitudinal region of the longitudinally aligned narrow pole faces.

By making the guide structure of two symmetrically alike guide walls 71 and two symmetrically alike guide elements 72, automatic alignment of the guide elements of the pole pieces and their symmetrical alignment with the longitudinal narrow pole face region is assured. The width of the guide channel elements 72 being slightly smaller than the width which they would have to be given in order to hold them positioned between perfectly parallel facing inner side wall regions 76 of the two guide wall members 71, so as to provide a small clearance of the order of four or five thousandths of an inch over which the side wall regions 76 overlying the guide channel elements 72 may be deformed into clamping engagement therewith by tightening the clamping screws 75 after the several elements of the transducer head are assembled in their operative position shown. The wall members 71 are designed to permit such slight elastic deformation notwithstanding their great rigidity.

By combining the flat pole piece elements of the transducer head and the windings mounted thereon with a mounting structure, so that the pole tip regions project beyond a boundary wall region of the mounting structure, it is possible to assure that the thin flat pole tip regions of the pole pieces are in alignment in a plane extending in the direction along which the wire moves as well as clamping of the projecting pole tip regions of the pole pieces between two flat wall members of a guide structure which guides a thin recording medium towards and away from the convex edge surfaces of the pole pieces bordering the gap and constituting the pole faces thereof.

A transducer head arrangement of the type shown in Figs. 2 and 9 makes it possible to design the several elements thereof so that the moving longitudinal recording medium such as the thin wire, engages the pole faces along a predetermined angular region thereof for assuring stable contact conditions, while at the same time limiting the maximum pressure exerted on the pole faces and preventing excessive and undesirable wear conditions.

In general, the longitudinally aligned pole faces 54 of the pole pieces form part of a circular arc. In the practical construction of such transducer head, in which the convex pole faces form arcuate portions of a circle having a diameter of $\frac{1}{16}$ of an inch, very stable contact and wear conditions have been obtained by making the angular region of the convex pole faces engaged by a moving wire about 12°, that is about 6° on each side of the pole face gap. In general, the angle of contact engagement of such transducer head should be in the range between about 8° to 16°.

In the angle of engagement or warp between the wire or filament 31 and the convex pole faces is too small, the stability of contact engagement between the moving recording medium and the pole face region of the gap suffers. If the angle of contact engagement is too large, excessive pressure develops, resulting in increased wear.

As explained above, the mounting structure elements 57, 58 of the double-pole-piece unit 60, such as shown in Figs. 11, 12, are provided with generally flat boundary wall regions 62 along which the aligned pole tip regions of the pole pieces project beyond the mounting structure, and with circular arcuate boundary wall regions 67 overlying the coil windings 52 and the core portions extending therethrough. The cavity spaces 77 of the two guide wall members 71, 72 within which the mounting elements fit, are provided with correspondingly shaped inwardly facing boundary wall regions 62—1, 67—1 facing the boundary regions 62, 67 of the mounting structure.

As indicated in Figs. 2, 3 and 17, 18 there is provided a small clearance distance 69 between the generally flat inwardly facing boundary wall 62—1 of the cavity 77 and the outwardly facing corresponding boundary wall regions 62 of the mounting structure of the double-pole-piece unit 60. This makes it possible to adjust the angular position of the gap region 63 of the pole pieces relatively to the direction along which the elongated recording medium, such as a wire moves toward and away from its position of contact engagement with an arcuate region of the pole faces.

In order to assure good and stable operating conditions, it is important that the pole face gap 53 shall substantially bisect the angle along which the moving elongated recording medium 31 engages the pole faces 54 as it moves towards and away from the gap region thereof. The provision of a small clearance space 69 between the boundary wall regions 62 of the pole piece mounting structure and the facing cavity walls 62—1 of the guide wall structure, makes it possible to readily adjust the angular position of the pole gap region 53 of the double pole piece unit so that it substantially bisects the angle formed by the sections of the moving wire which enter and leave its position of contact engagement with the angular pole face regions along which it moves.

In making such angular adjustment of the position of the double-pole-piece unit in the guide wall mounting structure 71, one may proceed as follows: The clamping screws 75 are slightly loosened so as to permit slight rotation of the double-pole-piece unit along their circular boundary regions 67 relatively to the inwardly facing corresponding wall regions 67—1 of the guide wall cavity 77. Thereupon, a record of a signal of a representative frequency, recorded on a length of the recording medium 31, which is impelled along the pole face region 54 of the pole pieces and is reproduced and supplied through a suitable measuring device, indicates the level of the reproduced signal. The double-pole-piece unit 6 is then angularly adjusted until it is brought to a position in which the level of the reproduced signal is a maximum, and the clamping screws 75 are tightened for retaining the double-pole-piece unit in this optimum operating condition.

In order to make it possible to manufacture satisfactory magnetic record transducer heads of the type described above in connection with Figs. 1 to 10 and 11 to 14, it is essential that at least one of the two mounting elements 57, 58 of a double-pole-piece unit of the type described in connection with Figs. 11 to 14, shall be of metal. Thus, in the case of the transducer head shown, the mounting element 57 of the double-pole-piece unit is made of metal. By using metal for one of the mounting elements of the double-pole-piece unit, the flat metallic aligning surfaces 57A thereof make it possible to obtain a stable and reliable flat surface for aligning the flat pole pieces in their operative position and assure that they are maintained in alignment when the other clamping member is clamped thereover.

With such arrangement, reliable and perfect alignment will be assured even if the other mounting member, such as mounting member 58, is made of a molded plastic and its aligning surfaces 58A are not perfectly flat, because by clamping the two mounting members against the pole pieces, their flat faces will be automatically aligned against the flat aligning surfaces 57A of the metallic mounting element 57. Furthermore, the good heat conductivity of such metallic mounting element of the double-pole-piece unit enables it to handle a relatively large amount of power, a factor of great importance particularly if such double-pole-piece unit is used as an A. C. erasing head, in which the power losses and the heat developed in the double-pole-piece unit is relatively large.

In addition, because of its electrical conductivity, the metallic mounting element of such double-pole-piece unit makes it possible to establish through it perfect electrical contact with the magnetic core elements of the double-pole-piece unit, and the metallic clamping screw 59 which engages it can be used as a ground connection for the pole pieces as required in many applications for such record transducer head. As shown in Figs. 2, 3 and 4, the head of the clamping screw of the double-pole-piece unit may be utilized to clamp thereto a soldering lug 59—1 to provide for such ground connection to the pole pieces.

A magnetic transducer head of the type described above in connection with Figs. 2 to 9 and 10 to 14 is very effective in suppressing disturbing leakage fluxes and cross talk because its magnetic core structure is designed to constitute a substantially closed magnetic circuit formed of two magnetic, substantially-alike and symmetrically-arranged cross sections and each core section is surrounded by two electromagnetically-equal and symmetrically-arranged winding sections which are interconnected to carry electric signals corresponding to the interlinking record flux.

In the arrangement shown, each core section or pole piece unit 51 and its surrounding winding section 52 is electromagnetically substantially alike and symmetrical with respect to the other and they are designed to form two electromagnetically balanced structures which are substantially symmetric with respect to their gap sections and are so arranged and correlated to each other that an external disturbing flux field traversing the two winding sections either in their axial direction or in a direction perpendicular thereto, will induce in the interconnected winding sections voltages which are substantially opposite in phase and magnitude so that they cancel, while the interconnected winding sections of the two pole pieces are very efficient in reproducing signals recorded on a magnetic track moving past the gap region along the pole faces or for making a new recording thereon corresponding to signal currents traversing the two coils.

In the transducer head described above in connection with Figs. 2 to 13, the two facing guide wall members 71 of the guide wall structure are exactly alike in shape and structure and may be made with the same mold or tool. Furthermore, each guide channel element is perfectly symmetric with respect to the axial plane of its guide channel structure, and each of the guide channel elements is of exactly the same shape and may be made with the same mold or tool. As a result, the guide channel elements 72 are substantially aligned with the pole face region of the pole pieces when the double pole piece unit and the two guide channel elements are placed in their position between the inwardly facing sides of the two guide wall members 71, and clamped therebetween, thereby eliminating the critical difficulties encountered in securing alignment of the guide channel elements which guide the record track towards and away from the pole face channel 56.

The taper of the guide surfaces of the guide channels 73, 74 of the guide structure of the transducer head is so designed and correlated to the narrow channel track forming the deepest region of the guide channel along which the thin wire of filament is guided, as to cause a thickened portion of the recording wire or filament, such as a splice joining the two ends of the wire to be lifted outwardly from the narrow bottom portion of the guide channel and cause the splice to ride along the outward regions of the tapered guide surfaces which deflect the splice from the narrow deep guide channel track while the splice moves past the transducer head.

In addition, the taper of the guide surfaces of the guide channels 73, 74 is so designed that they present to a protrusion, such as a splice deflected thereby, a support which prevents forces exerted by the tensioned wire or filament from wedging the protrusion within the narrow inward region of the channel. If the magnetic head of the type shown is used for recording with a D. C. biasing current, and a very compact transducer head structure is required, the mounting elements of the double-pole-piece used as well as the wall elements 71 of the guide structure may be formed of a non-magnetic metal.

The rear portions of the two guide wall members 71 are provided with recesses 81 for receiving therein the end portion of a mounting member such as arm 39 shown in Fig. 1, to which the transducer head may be clamped, as by a screw extending through holes 82 formed in the recessed region of the two wall members.

In order to facilitate practice of the invention and without in any way thereby limiting the scope thereof, there are given below data of a practical head of the type shown in the drawings.

The pole pieces are .014 inch thick and the distance between the pole tips is $\frac{1}{16}$ inch. The guide wall members are $\frac{3}{16}$ inch thick and their outer surfaces are flush with the outer surfaces of the double-pole-piece unit 60 held clamped therebetween. Each guide channel element is of a thickness slightly less than $\frac{1}{8}$ inch.

According to one phase of the invention, the guide channel elements 72 of the transducer head of the type shown are formed of a material of such greater hardness than permanent magnet alloy steel, such as ceramic materials, tool cutting materials, such as carbaloy or the like. Hard molded and fired ceramic materials, such as those manufactured by the American Lava Corporation, Burgens & Company and the Isolantite Co. of America, and referred to on page 334 of the "Materials Handbook" by G. S. Brady, published in 1944 by McGraw-Hill Book Co., are very effective for such guide channels because they withstand wear and assure stable guiding of the filament or wire in its aligned position towards and away from the pole face region of the pole pieces during prolonged periods of use. In general hard materials having a hardness as great as ceramic materials or greater are suitable for such guide channel elements 72.

According to the invention, materials of great hardness, such as used for making the guide channel elements 72, are utilized for the two guide wall members 71 of such transducer head, if it is used for guiding a flat tape or wire-like tape past the pole faces of the magnetic core structure held assembled between the two guide wall members in a manner analogous to that described above.

Figs. 8–A and 9–A show the cross-sectional configuration of the guide channel structure in the pole face region and the guide channel structure aligned on both sides of the pole face region when a recording process is carried on with a tape-like record track 31—5 having a generally flat cross-section. With such flat record track, the pole faces of the pole pieces are left flat without any pole face channels and the two pole pieces are held aligned across the gap between two wall members 71, 72 made of a hard material, such as refractory materials referred to above. The guide channel elements 72—A corresponding to the guide channel elements 72 of the transducer head described above are, however, made only of the same thickness as the pole pieces 51 used in such head.

In other words, in a magnetic transducer head of the type shown in Figs. 8-A and 9-A, the two side wall members 71—A are made of hard material, such as refractory material and such magnetic head is ideal for use with flat steel tapes of any required width as well as for narrow wire-like tape which may be level wound on a reel in substantially the same manner as round wire. When such magnetic heads are used with a wire-like tape 31—5 and the guide structure of the magnetic head is also utilized for level winding, the hard material, such as refractory material, of the two wall members 71—A will not be worn out by the thin knife-like edges of the wire sawing thereon, and thus there will be assured stability of operation of the recording system as well as proper level winding during prolonged periods of use.

The magnetic head described above in connection with Figures 1 to 6 may also be used for the recording of signals on or the reproducing of signals from a magnetic tape in the manner indicated in Figures 9-A, 10-A and 10-B. In such magnetic tape heads of the invention a number of thin laminations are cemented together, insulated from each other, and clamped between the two clamping members 57, 58 so as to form a double pole piece unit disposed face to face and of a width corresponding to or slightly narrower than the width of the tape. The double pole piece unit is then clamped between two guide wall members in a manner similar to the wire head described above so as to guide the tape along the surface of the guide member toward and away from the pole faces of the double pole piece unit. In such magnetic tape head there may be combined a double pole piece unit for the magnetic recording or reproducing operation and another double pole piece unit for the erasing operation. In such double heads the width of the pole faces of the recorder transducing unit is made slightly narrower than the tape. The width of the pole faces of the erasing head is made slightly wider than the width of the pole faces of the recording head. The erasing head should have pole faces preferably at least as wide as the width of the tape. The pole piece units of the recording-reproducing and erasing heads should be made of laminations, ranging in thickness from .002″ to .014″.

As explained above, essentially the same type of double-pole-piece unit may be used either for a reproducing head, or recording head, or erasing head, and several of such double-pole-piece units may be combined with two guide wall members into a transducer head structure provided with a multiple of double-pole-piece units. Figs. 15 to 18 show one form of a double-unit magnetic transducer head structure in which two double-pole-piece units 60, such as described above, are mounted in a common guide structure formed by two guide wall members 71—A similar to the guide wall members 71 for guiding a narrow wire or filament successively past the pole face regions of the magnetic double-pole-piece units 60. One double-pole-piece unit of such transducer head structure may be utilized, for instance, as the erasing head 35—E, and the other as the recording and playback head 35—R, such as described in connection with Fig. 1.

Because of the greater length of the guide channel required in a transducer head of the type shown in Fig. 15, the two guide wall members are provided with additional screws 75—A clampingly interconnecting the guide wall region extending between the two double-pole-piece units 60. The double-unit transducer head shown in Figs. 15 to 18 embodies all the desirable features of the single-unit transducer head described above in connection with Figs. 2 to 10 and 11 to 14.

Double-pole-piece units of the type shown in Figs. 11, 12 and described above may also be used without a guide structure for recording signals, for reproducing signals or for erasing magnetic records along a magnetic record trace formed on an exposed magnetic record surface of a sheet member, such as a tape or disk, in the manner described in the application of S. J. Begun, Serial No. 612,728, filed August 27, 1945.

In general, when a constant signal current of sinusoidal wave form and of a given frequency is used for making a record, the magnetic medium emerging from the gap region of the pole piece structure of the magnetic head is left with a continuous succession of identically magnetized elements of elemental magnets, as indicated in Fig. 1-A, wherein the individual elemental magnets of the recording medium are shown separated from each other by transverse lines and are marked with N and S to designate their north and south poles. The length of the incremental elements of the moving magnetic recording medium 31 which are subjected to the magnetic field of the recording head is determined primarily by the width of the non-magnetic gap 53 separating the pole faces of the recording head. Under ideal conditions, the distribution of the magnetic field over the length of each increment of the recording medium bridging the pole gap should be as uniform as possible and should approach a rectangular shape. However, because of the magnetic leakage, the shape of the magnetic field impressed by the gap region of the recording head on the recording medium is never rectangular but it spreads beyond the width of the physical gap separating the pole pieces so that the width of the effective recording gap or slit is greater than the actual physical gap between the pole pieces of the magnetic head.

In each magnet element so formed in the recording medium, the magnetic flux will vary sinusoidal along the medium in the manner indicated in Fig. 1-A by the fash line 31-C. The distance between two successive opposite magnetic flux maxima are equal to one-half of the recording wave length and may be considered as the length of identical, but oppositely polarized, elemental bar magnets formed in the recording medium. In general, for the medium and low frequency range of the recorded signals, the thickness of the elemental magnets so formed in the recording member will be substantially equal to the thickness of the recording medium, but the thickness of the magnets formed in the recording medium will decrease with increasing frequency, thereby reducing the effectiveness of the recording process in recording signals of higher frequencies.

In the reproducing or playback process, the succession of elemental magnets represented by the moving magnetic recording medium will induce in the magnetic core structure a correspondingly varying magnetic flux, which, under linear conditions, should be directly proportional to the magneto-motive force existing along the recording medium of a length equal to the effective pole gap width of the playback head. The voltage generated in the windings of the playback head is, in general, proportional to the rate of change of the flux through the magnetic circuit of the playback head. Although this might indicate that the voltage generated in the playback head will be proportional to the second derivative of the wave representing the recorded magnetomotive potential, and that the playback voltage should rise with the frequency at the rate of 12 db. per octave, this is not so. It can be shown that the voltage generated in the playback head rises with the frequency only at the rate of about 6 db. per octave until it reaches a peak value, the generated voltage dropping with a further rise in the frequency of the recorded signals.

The drop in the playback voltage at the higher frequencies is caused by the fact that with rising frequencies, the effects of the demagnetization of the bar magnets formed by the recording process and the penetration of the magnetic recording flux into the magnetic recording medium become increasingly dominant.

The demagnetization of the bar magnets or the weakening of their external field is increased with the decrease of their length. Since with rising frequencies the length of the recorded bar magnets or magnet waves forming the record becomes smaller and smaller, this effect becomes dominant at high frequencies at which the bar magnets represented by the recorded wave are very short. When recording with a recording head having pole faces aligned along one side of the moving recording medium in the manner indicated in Fig. 1–A, the recording flux enters the magnetic recording medium only at a small angle. This factor makes full penetration of the recording flux into the recording medium impossible at high frequencies at which the record is formed of short bar magnets or wave lengths.

Although it was known that, theoretically, the magnetic gap between the pole faces must be smaller than one wave length of the highest recorded frequency, it was recognized that the demagnetization effect described above controls the limit of the high frequency response and that reducing the pole gap below 1 or 2 mils was of no advantage. In practice, all magnetic heads made heretofore had a gap of the order of 2 mils, particularly since it is much simpler to manufacture magnetic heads having pole pieces spaced by a gap which is not smaller than 2 mils, and, furthermore, because with the available recording medium, the overall frequency response of the recording and playback process was not essentially changed by reducing the pole gap below about 2 mils.

In accordance with one phase of the invention, I have found that when using a magnetic recording medium about one micron in size or less, formed of powder particles of permanently magnetizable material, such as iron oxides, bonded together by a bonding compound, a materially better overall frequency response of the magnetic recording and playback process may be obtained by making the magnetic record transducer head so that the non-magnetic gap separating the pole face region of the pole pieces shall be only about five times the size of the magnetic powder particles or less, or, in general, of the order of 15 microns or less.

In particular, I have found that a magnetic record transducer head having such small non-magnetic gap separating the pole face regions of the magnetic pole pieces may be provided by placing the edges of the pole pieces facing the gap, such as the gap 53 of the transducer head shown in Figs. 2 to 8, in direct physical contact. In order to make it possible to produce magnetic record transducer heads, the pole piece ends of which are in physical contact so as to form therebetween a non-magnetic gap of a width of the order of 15 microns or less, the edges of the pole pieces facing each other on the opposite sides of the gap 53 are polished and given a very fine finish so that when they are pressed together along their fine polished surfaces, they form a magnetic discontinuity which is effective as a non-magnetic gap of the order of about 15 microns or less. Such construction of a magnetic record transducer head provided with such small gap is based on the recognition of the fact that when two plane surfaces of magnetically permeable material are placed in direct physical contact, the magnetic reluctance of the contact junction between the two plane surfaces cannot be reduced to zero. This phenomenon is caused by the fact that each plane contact surface, though polished, inherently exhibits a certain degree of microscopic roughness, and that such surfaces are usually covered by an extremely thin film of oxide and absorbed gases so that when they are pressed into contact engagement, the junction region between such magnetic contact surface exhibits characteristics of a non-magnetic gap of a width of the order of several microns, such as about 10 to 15 microns.

As explained above, magnetic heads of the type described above in connection with Figs. 1 to 18 are very effective for use in magnetic recording processes in which the magnetic medium is erased by an alternating current erasing field, and the new records are recorded by superimposing a high frequency A. C. biasing field on the field of the signals which are to be recorded. In this connection, it may be noted that such magnetic heads are also very effective for recording signals with a D. C. bias, in which case the recording medium is erased by an erasing head which subjects the recording medium to a direct current saturating field.

When a magnetic head structure of the type described above is used for erasing the previous records of the magnetic recording medium by an A. C. erasing field, the recording medium should leave the erasing head in a completely demagnetized neutral state. To secure such condition, the erasing field must have a peak value sufficient to saturate the recording medium and the field should gradually decay along the direction in which the recording medium is moving.

Although such erasing field may be impressed upon a moving magnetic recording medium by sending the high frequency erasing current through a coil surrounding the recording medium, this is objectionable because the recording medium has to be threaded through the coil. However, as explained above, this difficulty may be avoided by guiding the recording medium past the pole face region of a double-pole-piece unit of the type described above in connection with Figs. 1 to 18, and sending through the windings interlinked with the pole pieces high frequency currents which produce in the pole face region thereof a high frequency erasing field which decays in the direction in which the recording medium moves along the pole faces.

Since a substantial field strength is required in order to erase or neutralize the magnetic recording medium, a relatively large high frequency current has to be passed through the coils of the magnetic core structure and the high frequency current has to be of such magnitude that the entire structure of the erasing head becomes relatively hot. As explained above, by making one of the mounting elements of the double-pole-piece unit of metal, the temperature of such double-pole-piece unit used as a high frequency erasing head may be kept within permissible limits.

In general, when using as an erasing head a double-pole-piece unit of the type described above in connection with Figs. 1 to 18, no ideal complete demagnetization can be achieved since the decay of the erasing field along the direction of the motion of the recording medium is too abrupt. Accordingly, a signal corresponding to the frequency of the erasing field will be left recorded in the portions of the recording medium leaving such erasing head, but the amplitude of this record can be kept to a negligible value by using an erasing frequency whose recorded wave length at the speed of the action of the recording medium is smaller than the effective gap separating the pole pieces of the erasing head. In erasing a magnetic recording medium with a high frequency erasing field, difficulties are also encountered due to the fact that the penetration of the high frequency erasing flux into the recording medium is limited by reason of the magnetic skin effect and also by reason of the character of the flux distribution within the recording medium.

Although a magnetic head using pole pieces of the type described above in connection with Figs. 1 to 18 is fully effective in erasing wire-like magnetic recording media of a thickness as high as six mils, the foregoing difficulties due to limited penetration of high frequency flux makes it difficult to use such head structures for erasing with a high frequency field solid magnetic recording medium having an extensive cross-section materially larger than a cross-section of a wire of about six mils in diameter.

Figs. 19 to 21 show one form of a recording and erasing head structure generally similar to that described in connection with Figs. 15 and 16, but provided with a modified double-pole-piece unit for erasing the recording medium with a high-frequency erasing field. Between guide wall members 71—B, generally similar to those described above in connection with Figs. 2 to 6 and 15 to 18, are held clamped a double-pole-piece unit 60 serving as a recording and playback double-pole-piece unit and an erasing double-pole-piece unit 60—B of a slightly modified construction. The double-pole-piece unit 60—B has two pole pieces 51—B of a configuration similar to the pole piece of the double-pole-piece unit 60. However, it differs therefrom in that the pole tip portions 61—B of the pole pieces bordering the gap region 53—B along which the recording medium 31 moves are offset in opposite direction from the plane along which they are held clamped between the mounting members 57, 58 of the double-pole-piece unit 60—B, so that the recording medium 31 may pass through the gap region extending between the overlapping pole tips 61—B, in the manner indicated in Figs. 19 to 21.

In addition, the inwardly facing guide wall portions 74—B of the two guide wall members 71—B, along which the recording medium 31 moves past the pole tip regions 61—B of the double-pole-piece unit 60—B, are provided with depressions or recesses 74—C for accommodating therein the offset pole tips 71 of the double-pole-piece unit.

Although a transducer head structure of the type described in connection with Figs. 19 to 21 may have the same general form and overall size as the generally similar transducer head of Figs. 15 and 16, the transducer head of Figs. 19 to 21 is shown as somewhat larger in order to accommodate an additional guide channel element 72—B located in the region between the guide channel elements 74, 74—B of the guide wall structure 71—B for positively guiding a length of the moving recording wire or filament 31 moving from the pole face region of the double-pole-piece unit 60—B to the pole face region of the adjacent pole piece unit 60, or vice versa. The guide channel element 72—B is generally clamped between the end regions of the two guide wall regions 71—B in the manner explained above in connection with Figs. 2 to 8 and 15 to 18.

In Figs. 22 to 29 is shown a magnetic transducer head of the same general type as described in connection with Figs. 2 to 18, but designed in more compact form for use in applications such as a recorder worn on the body of the user.

The rigid mounting structure of the double pole piece unit is shown formed of two generally H-shaped mounting elements 1—27, 1—28, each having a cross bar 1—29 extending between the central region of the two end bars 1—31. Two such rigid mounting elements 1—27, 1—28 extend on the opposite sides of the two aligned pole piece assemblies 1—21 so that each pair of facing end bars 1—31 of the two mounting elements 1—27, 1—28 engage and confine between them two aligned pole piece regions emerging from the bobbin structure.

As shown in Figs. 26 to 29, the cross bar region 1—29 of each of the two mounting elements 1—27, 1—28 has substantially the same length as the bobbin, and their end bars 1—31 are so dimensioned that a pair of cooperating pole tip regions of the two pole pieces 51 projects beyond the outer boundary of the overlapping end bars 1—31 of the mounting structure. Furthermore, the inwardly facing region of the cross bar 1—29 of each rigid mounting element 1—27, 1—28 of the double-pole-piece mounting structure has generally circular curved side surfaces 1—32 extending between the facing sides of the two transducer winding coils 52, thereby giving to the cross bar 1—29 of each of the double-pole-piece mounting elements 1—27, 1—28 the required degree of rigidity, the two coils extending through the semi-cylindrical spaces provided on both sides of the two cross bars when they are united to each other and to the pole piece assemblies in the manner indicated in Figs. 26 to 29.

Each of the two mounting elements may be made of a non-magnetic metal, such as aluminum, and they may be united to each other so as to hold clamped between them two pole pieces with their coils, as by a screw 1—33 extending through a central hole of one element and engaging with the threaded screw shank a threaded hole of the other mounting element 1—28. Alternatively, one or both of the double pole piece mounting elements may be made of molded synthetic resin material. Only one of the two mounting elements 1—27, 1—28, for instance, mounting element 1—28, may be used as the rigid supporting body to which the two pole pieces are secured and united in their properly aligned position so as to constitute therewith a rigid self-supporting double pole piece unit. If such rigid mounting element 1—28 is made of metal, the two properly aligned pole pieces 51 with their bobbins and coils mounted thereon, may be united to the end bars 1—31 of such mounting element by soldering or by spot welding.

A readily detachable and exchangeable double pole piece unit, such as shown in Figs. 26 to 29, is arranged to be held between the wall members 1—13, 1—14 of the magnetic head structure with two aligned pole faces of a pole tip region exposed along an intermediate portion of a narrow guide channel track 1—12 in such manner as to expose the pole faces into operative engagement with the elements of the record track filament 30 moving and guided along the channel track 1—12. In the arrangement shown, the two pairs of exposed aligned pole tips projecting beyond the end bars 1—31 of the mounting structure are held clamped between the inwardly facing surface regions 1—16, 1—17 of the two wall members 1—13, 1—14 which adjoin the border of the cavity 1—18 formed in each wall member for receiving the two pole piece coils 1—22 and the rigid mounting elements 1—27, 1—28 of the mounting structure which form with the pole pieces a rigid unitary detachable structure.

The other pair of aligned pole tips of the two pole pieces 1—21 projecting beyond the rear bar elements 1—31 of their mounting structure are similarly held clamped between the corresponding rear regions of the two wall members 1—12, 1—14 overlying the exposed aligned pole pieces in the manner indicated in Figs. 22 to 24. The outwardly tapering guide surfaces 1—11 of the guide channel structure 1—10 are so designed that a tensioned length of the record track 30 which is biased toward the channel structure 1—10 is automatically guided by the guide surface into positive guiding engagement with the elongated narrow channel track 1—12 forming the deepest part of the channel structure.

In a compact magnetic recorder which has to be operated by a compact driving mechanism, such as the spring drive mechanism described above, it is also essential to design the recorder so that a minimum of power is required for reeling the record track past the transducer head from one reel to the other. With a recorder so designed, the tension imposed on the moving record track by the brake action exerted on the supply reel has to be kept at a level lower than generally desirable for such recorders. Furthermore, for the sake of compactness of the transducer head, the guide channel elements 1-35 have to be made compact and they provide a guide channel length shorter than normally desired.

Figs. 22 and 23 show an arrangement which makes it possible to suppress any propagation of vibrations along the moving record track or wire toward the element of the record track engaging the pole face region 1—24 and bridging the gap 1—23, as well as assure that the record track element bridging the gap maintains positive and stable engagement with the pole faces 1—24, notwithstanding the fact that the record track is subjected to less than normal tension and that the transducer head has only short guide channel elements 1—35 on both sides of the pole face region.

Vibration damping means and biasing means shown in the form of a strip 1—41 of damping material, such as flexible and relatively yieldable synthetic resin material, has portions 1—42 overlying the outer side of portions of the record track 30 moving towards and away from the transducer head, and they are held biased and pressed against the moving record track by biasing means shown in the form of a strip 1—44 of material, such as spring metal, which is retained in a position of alignment with the moving record track 30 and the guide channel 1—10, for instance, by two ears 1—45 and retained by a screw 1—46 extending through and held in position within suitable holes formed in the two wall members 1—13, 1—14.

As shown in Fig. 22, the damping pad has tapered end regions 1—43 arranged so that when an enlarged element of the record track, such as a splice, is impelled past the transducer pad, the damping pad will be deflected against the biasing action exerted thereon by the retaining strip 1—44. In a compact wearable magnetic recorder which has to be operated with a minimum of power, and in which the record track is subjected only to low tension, the record track which is usually formed of a thin steel wire, will usually not be broken, and it is preferable to operate such recorder with a length of record which does not contain any splice.

When using a wire-like record track which is free from splices or which contains splices the cross-section of which is only about twice the normal cross section of the record track, the damping pad 1—42 may be made of a standard damping material known as Viscoloid which is softly yieldable and which has proven satisfactory in prolonged use in such recorders. If such recorder is to be operated with splices having a cross section substantially larger than the cross section of the record track, the surface portions of the damping elements 1—42 which engage the record track portions moving towards and away from the transducer head may be covered with an outside layer of hard material which will readily lift the damping element 1—42 against the action of the biasing spring.

As shown in Fig. 23, the damping portions 1—47 which are held in engagement with portions of the record track moving towards and away from the transducer head may be formed of a hard material such as hard synthetic resin material, or a ceramic material, the central region of each damping pad facing and overlying a portion of the moving record track being provided with a layer 1—38 of a relatively soft yieldable damping material, such as Viscoloid.

It will be apparent to those skilled in the art that the novel principles disclosed herein in connection with specific exemplifications thereof will suggest various other applications and modifications of the same. It is accordingly desired that in construing the breadth of the appended claims they shall not be limited to the specific exemplifications of the invention described herein.

I claim:

1. In a magnetic record transducing head for transducing magnetic records by magnetic interlinkage with elements of a relatively moving flexible magnetic record track of filamentary width: transducing coil windings for carrying electric signals corresponding to the magnetic records; a magnetic core forming a substantially closed magnetic loop of flat sheet material the plane of which is substantially parallel to a plane extending transversely to the axis of the loop and having intermediate portions passing through said windings; said core having two outward core portions projecting in opposite directions from said coil windings, one of said outward core portions having pole portions separated by a non-magnetic gap so that outward sheet edge surfaces of the pole portions form elongated pole faces aligned along one side of a relatively moving track element bridging said gap for magnetically coupling said windings to said track element; a mounting structure overlying opposite sides of parts of each of the outward core portions for holding all elements of said magnetic core and said windings in their operative position; at least parts of each of the outward core portions constituting core projections extending beyond the boundary of the mounting structure; and a guide structure of substantially rigid material having an outwardly opening guide channel for guiding said record track toward and away from engagement with said pole faces past said gap; said guide structure including two flat elongated guide channel elements longitudinally aligned with said pole faces and each having an outwardly opening guide channel portion for guiding a portion of said track toward and away from said pole faces; said channel elements having flat sides parallel to the flat sides of said pole portions; said guide structure also including two wall members holding aligned and clamped therebetween the opposite sides of said pole portions and the opposite sides of said guide channel elements; said guide channel elements being of greater thickness than the pole portions in a direction transverse to the plane of the sheet material.

2. In a magnetic record transducing head as claimed in claim 1, in which the thickness of the mounting structure, in a direction transverse to the plane of the sheet material of the core, is of the order of the thickness of the guide structure.

3. In a magnetic record transducing head as claimed in claim 1, in which the material of said channel elements has a hardness of the order of the hardness of the material of said track, or greater.

4. In a magnetic record transducing head as claimed in claim 3, in which the elongated poleface edges have an elongated groove aligned with the channel portions of the channel elements.

5. In a magnetic record transducing head as claimed in claim 4, in which the mounting structure comprises two clampingly joined mounting members overlying and clamped to opposite sides of each of the outward core portions.

6. In a magnetic record transducing head as claimed in claim 5, in which each of the two mounting members has a wall portion overlying the windings and two spaced clamping projections engaging the outward core portions.

7. In a magnetic record transducing head as claimed in claim 6, in which at least one of said mounting members is of metal.

8. In a magnetic record transducing head as claimed in claim 7, in which the metallic mounting member has a transverse recess across its clamping projections separating each clamping projection into sections engaging different legs of said core.

9. In a magnetic record transducing head as claimed in claim 8, in which the thickness of the mounting structure, in a direction transverse to the plane of the sheet material of the core, is of the order of the thickness of the guide structure.

10. In a magnetic record transducing head as as claimed in claim 1, in which the material of said channel elements has a hardness of the order of the hardness of the material of said track, or greater.

11. In a magnetic record transducing head as claimed in claim 10, in which the mounting structure comprises two clampingly joined mounting members overlying and clamped to opposite sides of each of the outward core portions, each of the two mounting members having a wall portion overlying the winding, and two spaced clamping projections engaging the outward core portions.

12. In a magnetic record transducing head as claimed in claim 11, in which at least one of said mounting members is of metal.

13. In a magnetic record transducing head as claimed in claim 12, in which the metallic mounting member has a transverse recess across its clamping projections separating each clamping projection into sections engaging different legs of said core.

14. In a magnetic record transducing head as claimed in claim 13, in which the thickness of the mounting structure, in a direction transverse to the plane of the sheet material of the core, is of the order of the thickness of the guide structure.

15. In a magnetic record transducing head for transducing magnetic records by a magnetic interlinkage with elements of a relatively moving magnetic record track: transducing coil windings for carrying electric signals corresponding to the magnetic records; a magnetic core forming a substantially closed magnetic circuit of flat sheet material aligned parallel to the direction of the facing length of the track and having intermediate portions passing through said windings; said core having two outward portions projecting in opposite directions from said coil windings, one of said outward core portions having pole portions separated by a non-magnetic gap so that outward sheet edge surfaces of the pole portions form elongated pole faces aligned along one side of a relatively moving track element bridging said gap for magnetically coupling said windings to said track element; and a mounting structure having two mounting members overlying opposite sides of said windings and opposite parts of each of the outward core portions for holding all elements of said magnetic core in their operative position and covering said windings; at least parts of each of the outward core portions constituting core projections extending beyond the boundary of the mounting structure.

16. In a magnetic record transducing head for transducing magnetic records by magnetic interlinkage with elements of a relatively moving magnetic record track; transducing coil windings having two winding sections for carrying electric signals corresponding to the magnetic records; a magnetic core forming a substantially closed magnetic circuit of flat sheet material aligned parallel to the direction of the facing length of the track and having two core legs passing through said windings; said core having two outward core portions projecting in opposite directions from said winding sections, one of said outward core portions having pole portions separated by a non-magnetic gap so that outward sheet edge surfaces of the pole portions form elongated pole faces aligned along one side of a relatively moving track element bridging said gap for magnetically coupling said windings to said track element; and a mounting structure having two clampingly joined mounting members each having a wall portion overlying said windings and having two spaced clamping projections engaging opposite sides of parts of each of the outward core portions for protecting said windings and holding all elements of said magnetic core in their operative position and joining them into a self-supporting operative unit; at least parts of each of the outward core portions constituting core projections extending beyond the boundary of the mounting structure.

17. In a transducing head as claimed in claim 16, in which at least one of said mounting members is of metal and in which at least one of the clamping projections has a transverse recess separating the clamping projection into two sections engaging the core portions of two different legs of the core.

18. In a magnetic record transducing head as claimed in claim 17, in which the pole faces are of circular arcuate shape and the mounting structure has a mounting hole centrally positioned relative to the arcuate pole pieces, so that by rotating the core relative to the mounting hole the position of the gap may be adjusted to optimum operating condition relative to the moving record track.

19. In a magnetic record transducing head as claimed in claim 15, in which the pole faces are of circular arcuate shape and the mounting structure has a mounting hole centrally positioned relative to the arcuate pole pieces, so that by rotating the core relative to the mounting hole the position of the gap may be adjusted to optimum operating condition relative to the moving record track.

20. In a magnetic record transducing head as claimed in claim 16, in which the pole faces are of circular arcuate shape and the mounting structure has a mounting hole centrally positioned relative to the arcuate pole pieces, so that by rotating the core relative to the mounting hole the position of the gap may be adjusted to optimum operating condition relative to the moving record track.

OTTO KORNEI.

REFERENCES CITED

The following references are of record in the file of this patent:

UNITED STATES PATENTS

| Number | Name | Date |
|---|---|---|
| 1,867,179 | Schroeter | July 12, 1932 |
| 2,277,305 | Copton | Mar. 24, 1942 |
| 2,351,003 | Camras | June 13, 1944 |